United States Patent
Gannon

(10) Patent No.: US 8,717,494 B2
(45) Date of Patent: May 6, 2014

(54) OPTICAL READING DEVICE WITH IMPROVED GASKET

(75) Inventor: Colleen P. Gannon, Jordan, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 124 days.

(21) Appl. No.: 12/854,319

(22) Filed: Aug. 11, 2010

(65) Prior Publication Data

US 2012/0038821 A1 Feb. 16, 2012

(51) Int. Cl.
*H04N 5/225* (2006.01)

(52) U.S. Cl.
USPC ............................. 348/373; 348/374; 396/535

(58) Field of Classification Search
USPC .................................... 348/373, 374; 396/535
See application file for complete search history.

(56) References Cited

U.S. PATENT DOCUMENTS

| | | | | |
|---|---|---|---|---|
| 4,983,456 A * | 1/1991 | Iwaskow et al. | ............... | 442/229 |
| 6,956,610 B1 * | 10/2005 | Walls | ............................ | 348/340 |
| 7,557,860 B2 * | 7/2009 | Frith | .............................. | 348/374 |
| 2004/0050188 A1 | 3/2004 | Richards et al. | | |
| 2006/0278820 A1 * | 12/2006 | Senba et al. | .................. | 250/239 |
| 2007/0211445 A1 * | 9/2007 | Robinson et al. | ............. | 361/818 |
| 2007/0228306 A1 | 10/2007 | Gannon et al. | | |
| 2008/0041954 A1 | 2/2008 | Gannon et al. | | |
| 2008/0246845 A1 * | 10/2008 | Chan | ......................... | 348/207.2 |
| 2011/0130627 A1 * | 6/2011 | McGrail et al. | ............... | 600/109 |
| 2011/0130632 A1 * | 6/2011 | McGrail et al. | ............... | 600/188 |

* cited by examiner

*Primary Examiner* — Antoinette Spinks

(74) *Attorney, Agent, or Firm* — Additon, Higgins, Pendleton & Ashe, P.A.

(57) ABSTRACT

An optical reading device is described having an image sensor having a sensor array of pixels which are exposed to an image; a printed circuit board (PCB) for carrying the image sensor; a lens assembly for focusing light on the sensor array; a lens retainer for retaining the lens; a support assembly integral with the lens retainer, the support assembly having a containment section for containing the image sensor; and a thermally and electrically conductive elastomeric gasket disposed between the containment section and the image sensor and for contacting the image sensor.

21 Claims, 7 Drawing Sheets

OPTICAL READING DEVICE WITH IMPROVED GASKET

FIELD OF THE INVENTION

The present invention relates to indicia reading devices, and more particularly to an indicia reader configured to read near and far indicia with a single action trigger.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Efforts regarding such systems have led to continuing developments to improve their versatility, practicality and efficiency.

DETAILED DESCRIPTION

Figure 1:
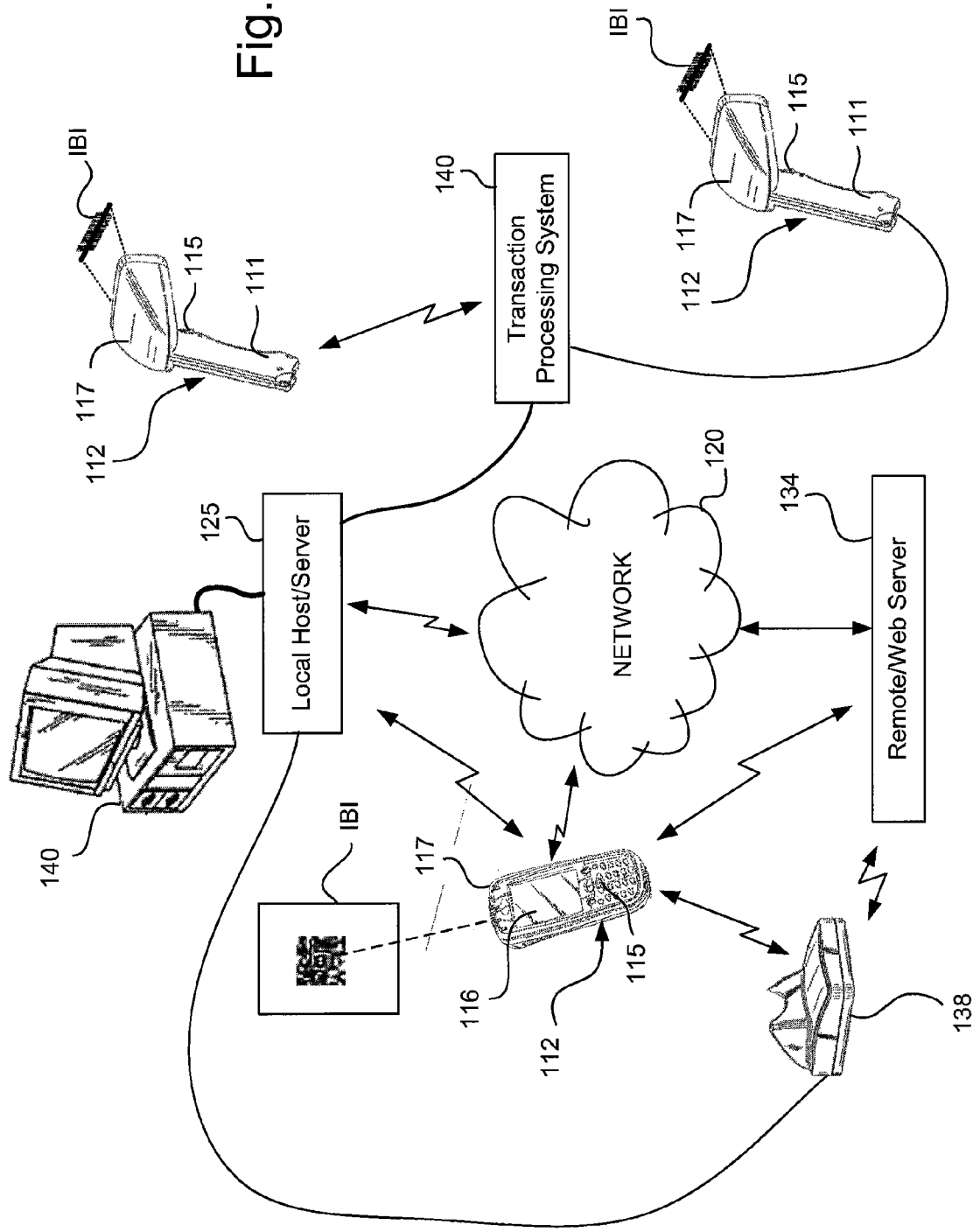
FIG. 1 is a block diagram of an exemplary indicia reader system.

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

The Figures illustrate an exemplary scanning system configuration, wherein a plurality of indicia readers 112 are operated and utilized where information bearing indicia (IBI) are present. The indicia readers may be stationary or hand-held and may be an imaging indicia reading device, also known as optical imaging device or optical indicia reading device, utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. The reader may be utilized in a presentation mode, wherein the reader takes consecutive images without the need for trigger activation. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. An exemplary indicia reader may have a display 116. An exemplary indicia reader 112 may have a number of subsystems provided within a housing 117 configured to be hand held. For example, the reader may have a handle portion 111.

Exemplary indicia readers may be in communication (wired or wireless) to a local transaction processing system 140, such as a cash register, customer station or employee station or local host/server 125 directly or through a charging station or base 138. An exemplary local server 125 or indicia reader 112 may be in communication with network 120 and or a remote/web server 134.

Figure 2:
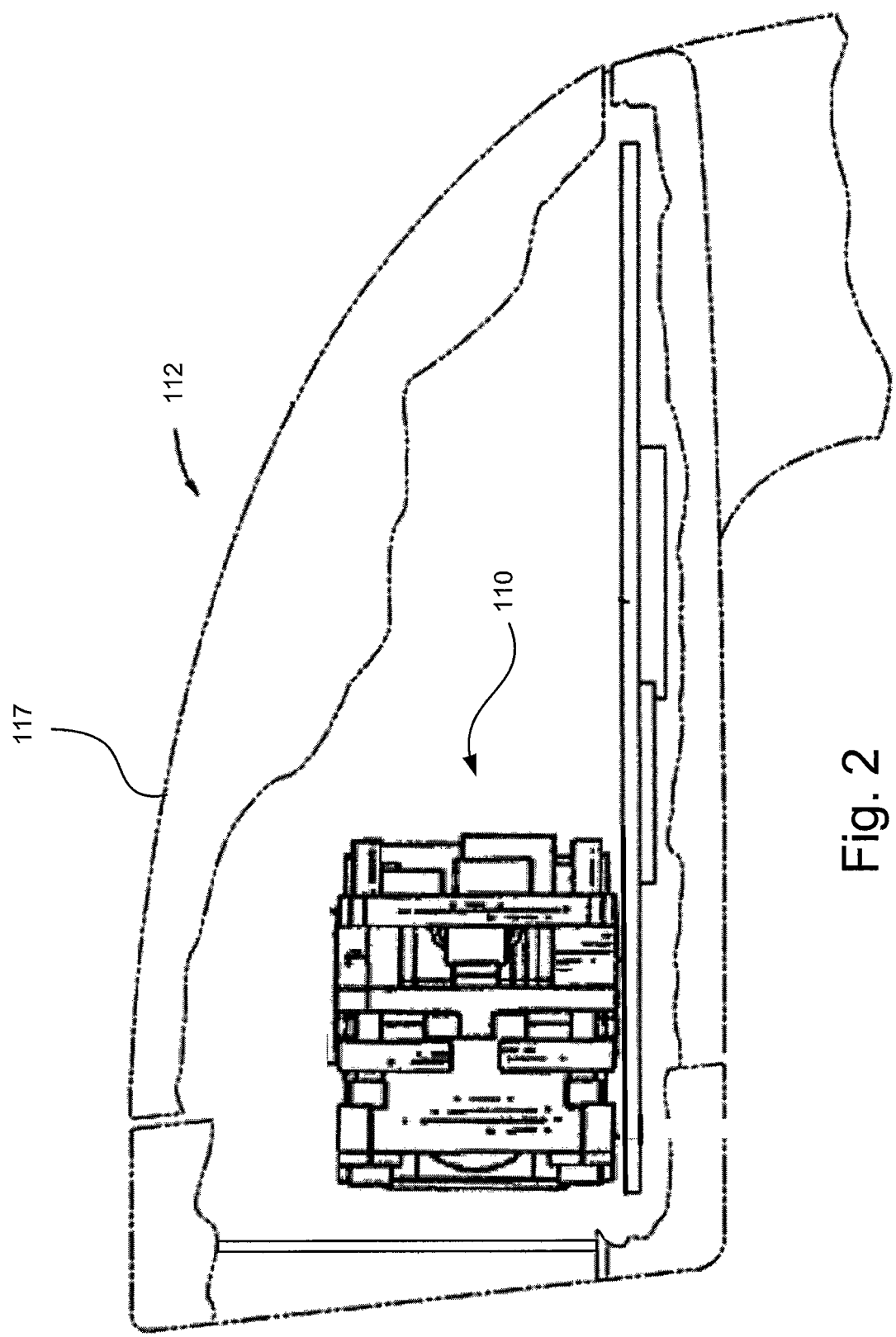
FIG. 2 is a fragmentary partially cutaway side view of a reader having an imaging module in accordance with the invention.

FIG. 2 illustrates an enlarged fragmentary cross-sectional view of an exemplary optical or indicia reader 112 which may include an imaging assembly 110 packaged in a housing 117.

Figure 3:
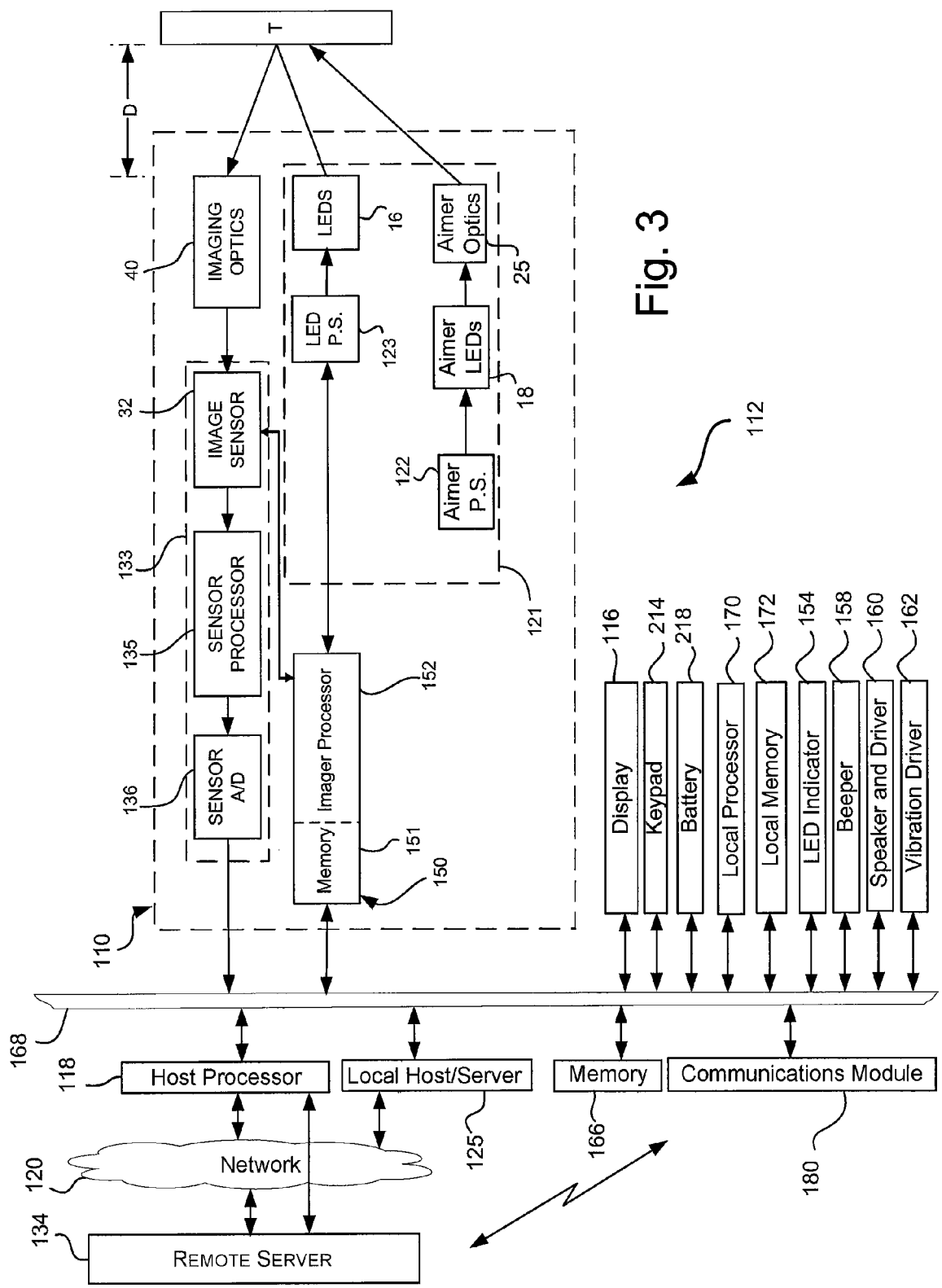
FIG. 3 is a block schematic diagram of an exemplary imaging module.

Referring to FIG. 3, an imaging system may include an imaging assembly 110 which may include an illumination assembly 121 for illuminating a target area T, such as a substrate bearing a 1D or 2D bar code symbol or a text string, a document or portion of a document or other machine readable indicia, and an imaging assembly 133 for receiving an image of object T and generating an electrical output signal indicative of the data optically encoded therein. Illumination assembly 121 may, for example, include an illumination source assembly e.g. LED power supply 123, aimer power supply 122, LEDs 16, 18, illuminating optics (not shown), aimer optics components 25, (such as lenses, diffusers, wedges, reflectors, etc.) for directing light in the direction of a target object T. Illumination assembly 121 may comprise, for example, laser or light emitting diodes (LEDs) such as white LEDs or red, infrared LEDs. Illumination assembly 121 may include target illumination optics for projecting an aiming pattern on a target T. Illumination assembly 121 may be eliminated or disabled if ambient light levels are certain to be high enough to allow high quality images of object T to be taken. Illumination assembly 121 may also be located remote from imaging device 112, at a location so as to eliminate or reduce specular reflections.

An exemplary image sensor 32 converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The imager may be either a progressive or interleaved imager. The image sensor may contain an array of light sensitive photodiodes (or pixels) that convert incident light energy into electric charge. Many solid state image sensors also allow regions of a full frame of image data to be addressed.

An exemplary image sensor may use a monocolor image sensor that may include a filter element defining color sensitive pixel elements dispersed throughout an array of monochrome pixels. Operation of the monocolor image sensor is to subsample color images (monochrome or full color) utilizing associated optimal sensor settings for image capture or symbology scanning. Exemplary monocolor image sensors are described in U.S. Patent Publication Number 20060274171 entitled DIGITAL PICTURE TAKING OPTICAL READER HAVING HYBRID MONOCHROME AND COLOR IMAGE SENSOR ARRAY the entirety of which is hereby incorporated herein by reference.

Imaging device processor assembly 150 may include a programmable control circuit or imager processor 152. Imager processor 150 controls the amount of illumination provided by LEDs by controlling the output power provided by LED power supplies. Imager processor 152 may also control other functions and devices. The processor may include configurable blocks of analog and digital logic, as well as programmable interconnects. Processor 150 may include a predetermined amount of memory 151 for storing data.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more local processor(s) 118, a local host/server 125, local memory 166, network 120 or remote server host/server 134.

Communications module 180 may provide a communication link from imaging reader 112 to other indicia readers or to other systems such as a server/remote processor 134.

An exemplary processor may be a mixed-signal array with on-chip controller devices designed to replace multiple traditional MCU-based system components with one single-chip programmable device. It may include configurable blocks of analog and digital logic, as well as programmable interconnects.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon configuration settings stored in firmware or memory which may be any one of a number of memory types such as RAM, ROM, EEPROM, etc. In addition some memory functions may be stored in memory provided as part of the processor(s). Configuration settings may be arranged as parameter tables.

Exemplary functions of the processor(s) may be controlling operation the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal. The processor(s) may be located on board or within the housing with other subsystems.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use.

Two exemplary scanning modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the reader in discontinuous mode is via hand held operation. Decoding stops once the indicia reader is no longer triggered. The discontinuous mode is typically initiated because the operator knows a symbol is present.

Exemplary indicia readers may use memory or firmware to store reader settings or reader configuration settings.

Figure 4:
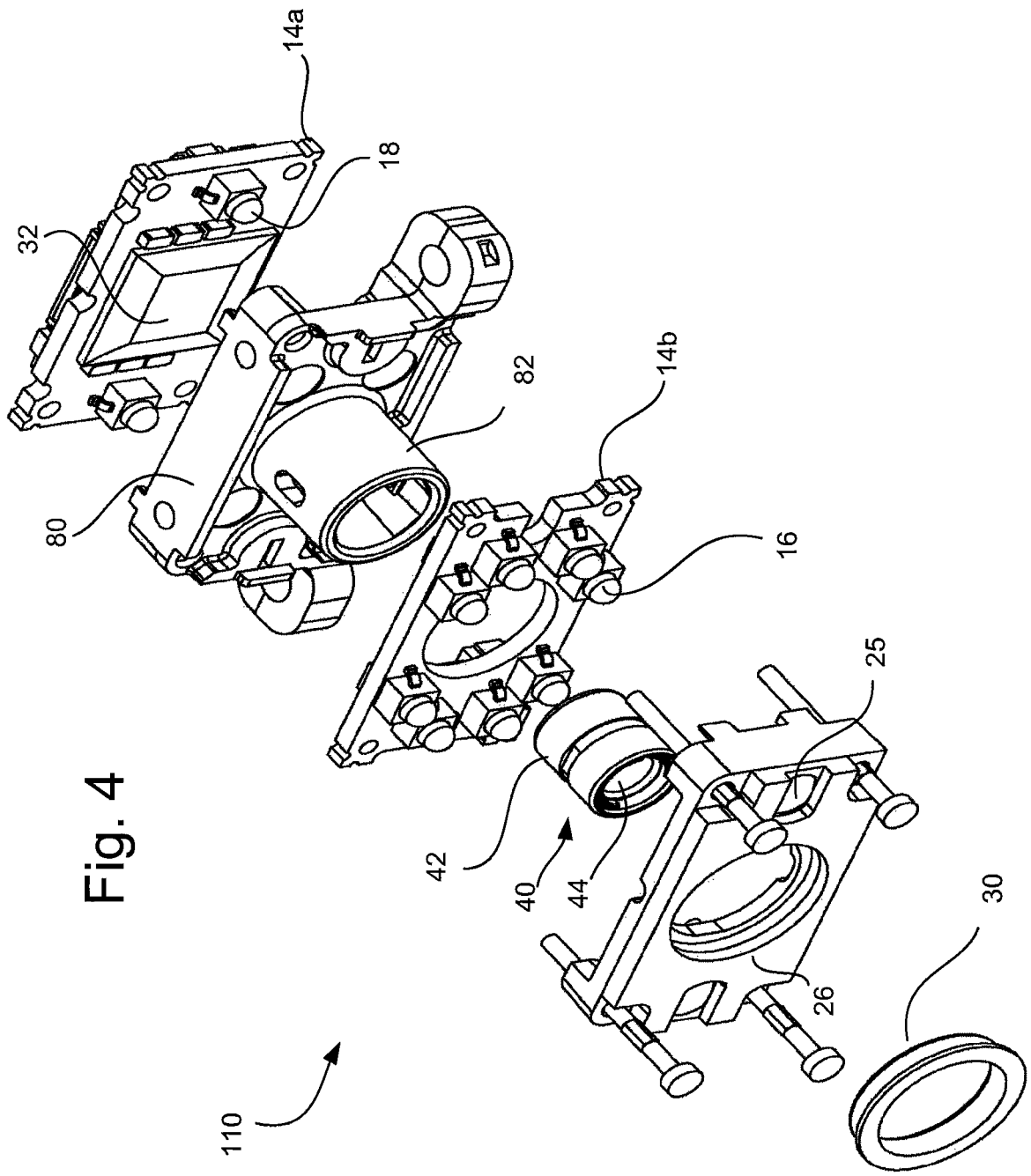
FIG. 4 is a perspective assembly view of an exemplary imaging module assembly.

Exemplary configuration settings are:
the current port utilized to send output data over
address buffer space in which scan data will be stored
whether scanning is to be continuous or discontinuous
codes which are enabled for processing
aiming pattern center coordinates
aimer configuration
aiming system power output
optical reader configuration
optical reader orientation
number of pixels in the image to be used for initializing buffers
engine orientation
field illumination
information regarding lens distortions
information regarding image distortion
dead or bad imager pixels
image sensor noise corrections within the image processing algorithm
Illumination LED current
receiving lens prescription or parameters
whether the imager is enabled for image capture
what type of decoder level is enabled
what types of symbology decoding is enabled
scanning distance
trigger functionality
pre-defined bar code output data based on the scan input
continuous scanning mode
discontinuous scanning mode or routine
decoding mode or routine
I/O configurations
min/max symbology character lengths
scan engine selection
illumination control
settings that affect the functional operation of the processor(s)
aimer operation
engine orientation
illumination
photosensor control
speaker control
beeper control
notification LED control
software control
sales tracking
warranty tracking
scanner capabilities
exposure gain Referring to FIG. 4, an exemplary imaging module 110 may include a light source 16 for illuminating a target. The light source is located a distance away from a lens 40, which focuses light being received from the target on an image sensor 32.

Imaging module 110 may include a first board 14*a* carrying such things as an image sensor 32 typically provided by an image sensor chip and aiming light sources 18, an imager processor, memory, etc. and a second circuit board 14*b* for carrying such things as illumination light sources 16. The first and second circuit boards 14*a* and 14*b* are supported by a support assembly 80. Support assembly 80 may include a containment section for containing image sensor 32 and an integrated retainer section 82 for retaining a lens or optics assembly 40 having a lens 44 retained by a lens housing 42. Imaging module 110 further may include an optical plate 26 which serves as a light pipe to carry various emitted light for aiding in the development of a substantially uniform illumination pattern over a target area corresponding to a field of view of image sensor 32. An aiming optic 25 aids in the projection of an aiming pattern in a target area.

Figure 5:
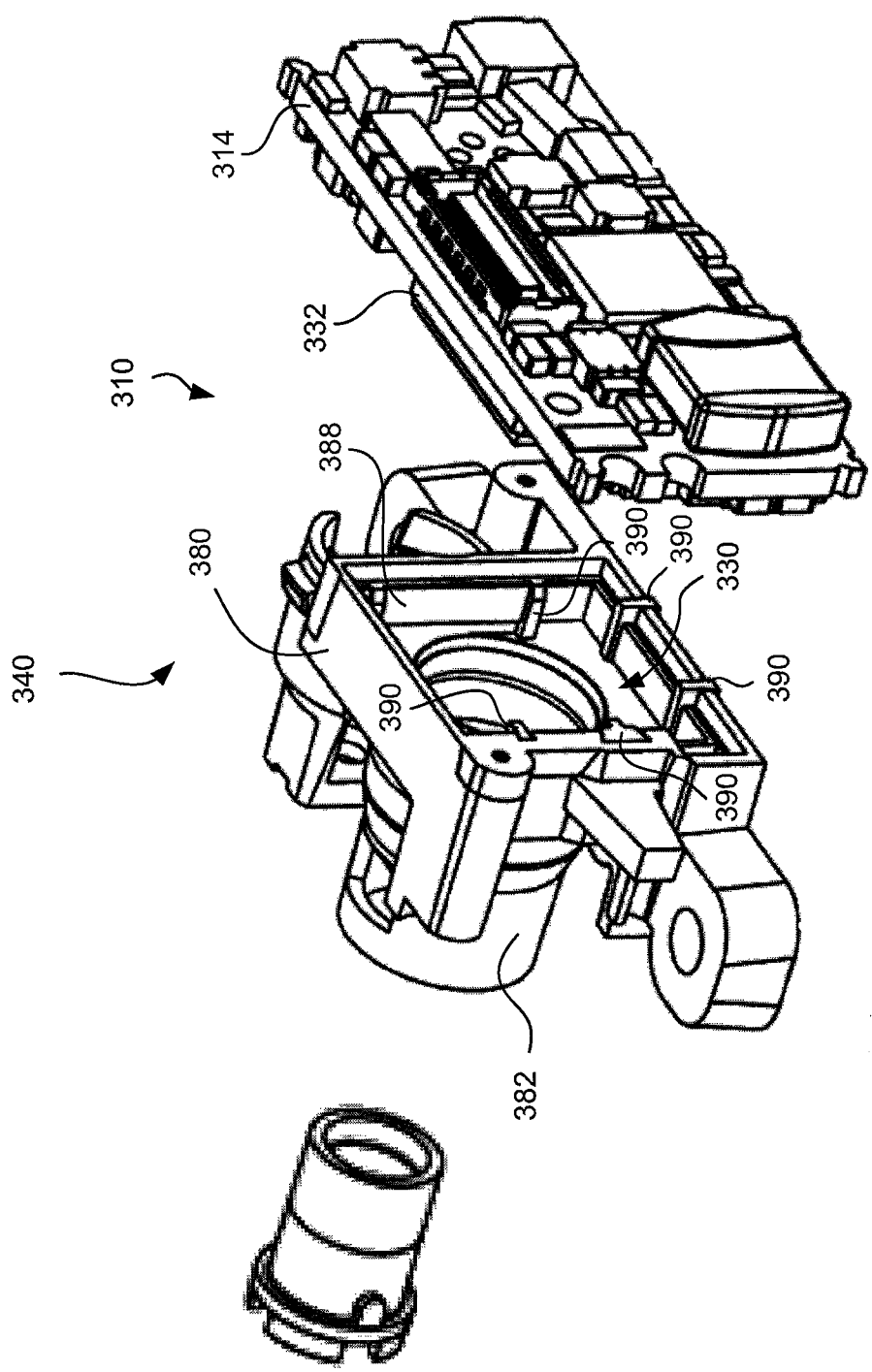
FIG. 5 is a perspective assembly view of an exemplary imaging module assembly.
Figure 6:
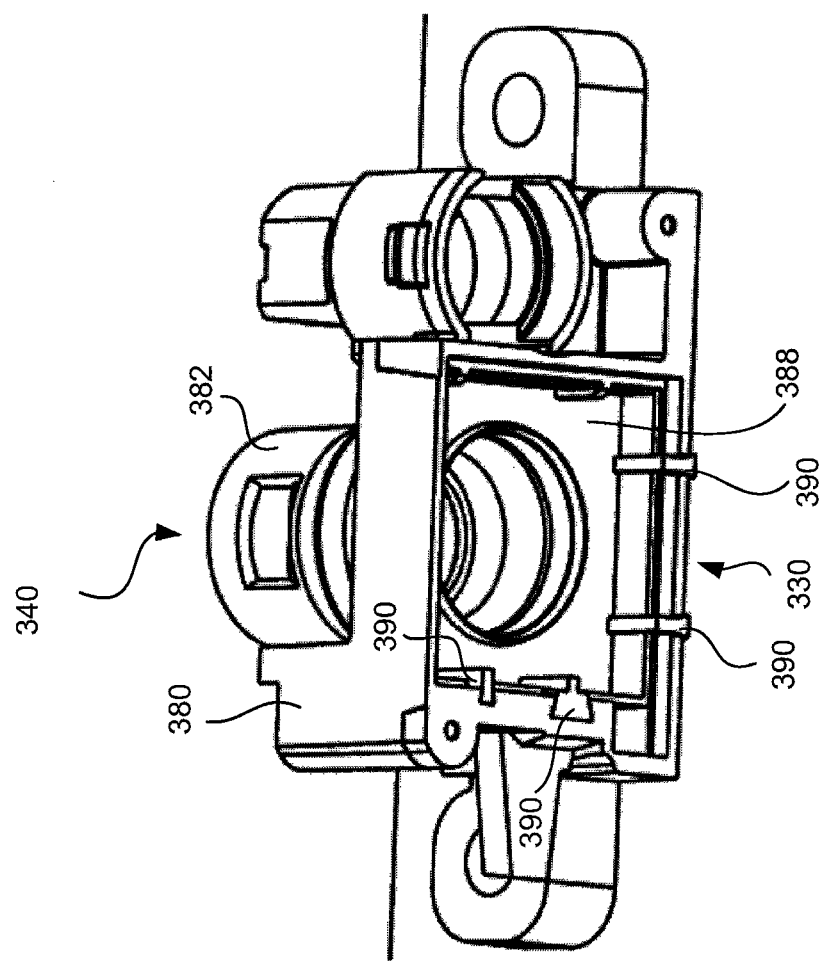
FIG. 6 is a perspective assembly view of an exemplary support assembly
Figure 7:
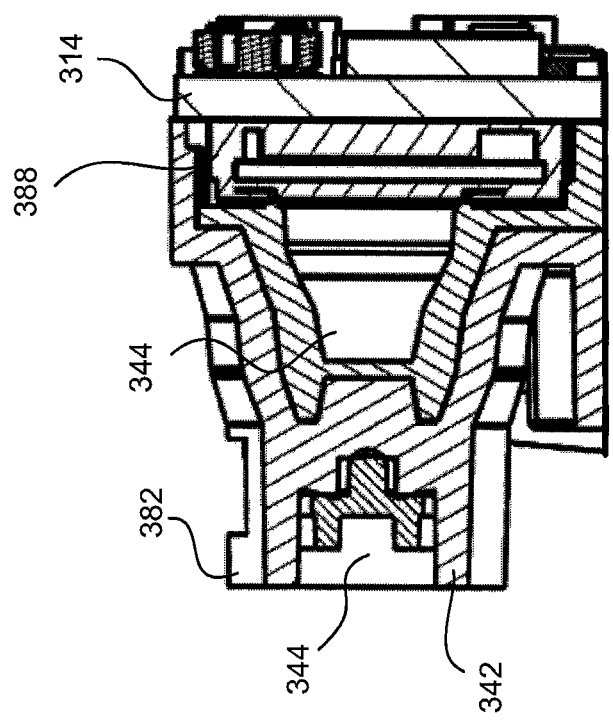
FIG. 7 is a cutaway side view of an exemplary imaging module.

Referring to FIGS. 5, 6 and 7, an exemplary imaging module 310 may include a board 314 or printed circuit board (PCB) for carrying such things as at least one image sensor 332 provided on an image sensor chip which may also include an image sensor processor and a sensor analog to digital converter (A/D). Board 314 may also carry other components, such as processors, light sources, memory chips, power supplies, etc. The image sensor and Board 314 is supported by a support assembly 380. Support assembly 380 may include a containment section for containing image sensor 332 and an integrated retainer section 382 for retaining a lens or optics assembly 340. Containment section 330 may be an enclosure, cavity or chamber for containing or mating with the image sensor 332, which protrudes from board 314. Containment section 330 is integrated with and open to integrated retainer section 382 for retaining a lens or optics assembly. A lens or optics assembly focuses light on the image sensor.

In an exemplary embodiment, the containment cavity 330 is lined with a thermally and electrically conductive elastomeric gasket 388 that contacts the image sensor 332.

In an exemplary embodiment, the support assembly 380 is a non-electrically conductive injection molded plastic housing and the gasket 388 is a thermally and electrically conductive elastomer. A number of contacts or contact points 390 may be provided in the gasket 388 to provide contact points with a ground plane on the PCB and/or contact the mounting surface of the imaging module. The elastomer may also contact the exposure surface of the image sensor, which may be comprised of glass.

Gasket 388 may create a sealed chamber to prevent dust and dirt intrusion into the cavity and contact part of the sides of the image sensor to conduct heat away from the image sensor. Gasket 388 may also provide electromagnetic shielding for the image sensor and block transmission or receipt of electromagnetic interference (EMI).

In an exemplary embodiment, the gasket may be a separate die cut, compression molded or injection molded part.

In an exemplary embodiment, the gasket may be overmolded into an injection molded plastic housing. Overmolding is an injection molding process wherein a pre-mold is insert molded out of one material and then transferred to a second mold. A second material is then molded over the first to create a final molded part. In the overmolding process there may no need for primers or adhesives. The pre-mold may be fabricated from a rigid plastic. In the secondary operation, a TPE may be used.

In an exemplary embodiment, the gasket 388 is comprised of a thermoplastic elastomer (TPE). TPEs are a class or family of copolymers or a physical mix of polymers (e.g. plastic and rubber) which consist of materials with both thermoplastic and elastomeric properties. The crosslink in a thermoplastic elastomer polymer is a weak dipole or hydrogen bond that takes place in one of the phases of the material. TPEs can be repeatedly stretched without permanently deforming the shape of the part and do not require curing or vulcanization, as they are true thermoplastics. TPEs may be processed by conventional thermoplastic techniques such as injection molding, extrusion and blow molding. There are six main TPE groups found commercially; styrenic block copolymers, polyolefin blends (TPOs), elastomeric alloys, thermoplastic polyurethanes (TPUs), thermoplastic copolyesters and thermoplastic polyamides.

An exemplary thermally & electrically conductive TPE is CoolPoly® E-series (a trademark of Cool Polymers, Inc.), such as CoolPoly E8103 made by Cool Polymers® Inc. may be utilized. The electrical conductivity measured as electrical resistivity may be in the range 0.1 to 10,000 ohm-cm. This conductivity range and may be desired for shielding electromagnetic and radio frequency energy. CoolPoly E-Series plastics may also be modified to achieve lower levels of electrical conductivity for applications requiring electrostatic dissipation ($10^6$ to $10^{10}$ ohm-cm).

The thermal conductivity of may be in the range from 1.0 W/mK to 100 W/mK, which is 5 to 500 times the value of conventional plastics. The optimal level of thermal conductivity for any application depends on the power input, size of the part and the convection conditions.

Exemplary characteristics of a TPE are as follows:

|  | SI/Metric | English | Testing Standard |
|---|---|---|---|
| Thermal |  |  |  |
| Thermal Conductivity | 5 W/mK |  | ASTM E1461 |
| Thermal Diffusivity | 0.0249 cm$^2$/sec |  | ASTM E1461 |
| Specific Heat | 1.94 J/g ° C. |  | ASTM E1461 |
| Mechanical |  |  |  |
| Tensile Strength | 1.28 MPa | 186 psi | ISO 37 |
| Nominal Strain @ Break | 57% | 57% | ISO 37 |
| Tear Strength |  |  |  |
| Method B | 14 kN/m | 80 pli | ISO 34-1 |
| Physical |  |  |  |
| Density | 1.13 g/cc | 0.0408 lb/in$^3$ | ISO 1183 |
| Hardness | 38 Shore A | 38 Shore A | ISO 48 |
| Mold Shrinkage |  |  |  |
| Flow | 1.5% | 0.015 in/in | ASTM D551 |
| Cross-Flow | 2.1% | 0.021 in/in | ASTM D551 |

In an exemplary embodiment, only thermal conductivity may be desired and not electrical conductivity. An exemplary plastic for this may be CoolPoly D8102 or CoolPoly D8104.

In an exemplary embodiment, RTP company electrically conductive TPEs may be utilized.

Exemplary conductive fillers for the TPE are carbon black, carbon fibers, carbon nanotubes, nickel coated graphite fibers, stainless steel fibers, etc. The degree of conductivity imparted depends on the type of conductive filler, filler content and the end-use requirements.

An exemplary conductive filler for the TPE are NCG fibers incorporated by extrusion compounding. In an exemplary embodiment, conductive TPE's may be made using NCG fibers loading's of 15%, with shielding levels and bulk resistivity of 0.080 ohm-cm. The level of conductivity of the TPE may be tailored to specific end use requirements by varying the fiber loading level. Exemplary NCG fiber levels may be between 5-10%. The resulting TPE is readily moldable or extrudable under normal processing conditions.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. An optical reading device comprising:
    an image sensor having a sensor array of pixels which are exposed to an image;
    a printed circuit board (PCB) for varying the image sensor;
    a lens assembly for focusing light on the sensor array;
    a lens retainer for retaining the lens;
    a support assembly integral with the lens retainer, the support assembly having a containment section for containing the image sensor; and,
    a thermally and electrically conductive elastomeric gasket within the containment section and contacting the image sensor wherein the optical reading device is an optical indicia reading device for extracting data from information bearing indicia.

2. An optical reading device in accordance with claim 1, wherein the thermally and electrically conductive elastomeric gasket comprises at least one contact to provide a contact point with a ground plane on the PCB.

3. An optical reading device in accordance with claim 1, wherein the thermally and electrically conductive elastomeric gasket comprises at least one contact to contact a mounting surface of the image sensor.

4. An optical reading device in accordance with claim 1, wherein the thermally and electrically conductive elastomeric gasket contacts the exposure surface of the image sensor.

5. An optical reading device in accordance with claim 1, wherein the thermally and electrically conductive elastomeric gasket creates a sealed chamber.

6. An optical reading device in accordance with claim 1, wherein the thermally and electrically conductive elastomeric gasket contacts a side of the image sensor.

7. An optical reading device in accordance with claim 1, wherein the thermally and electrically conductive elastomeric gasket provides electromagnetic shielding for the image sensor.

8. An optical reading device in accordance with claim 1, wherein the thermally and electrically conductive elastomeric gasket is die cut, injection molded or compression molded part separate from the support assembly.

9. An optical reading device in accordance with claim 1, wherein the thermally and electrically conductive elastomeric gasket is overmolded into the support assembly.

10. An optical reading device comprising:
- an image sensor having a sensor array of pixels which are exposed to an image;
- a printed circuit board (PCB) for carrying the image sensor;
- a lens assembly for focusing light on the sensor array;
- a lens retainer for retaining the lens;
- a support assembly integral with the lens retainer, the support assembly having a containment section for containing the image sensor;
- a conductive elastomeric gasket within the containment section and contacting the image sensor; and,
- a housing configured for hand held operation for supporting the image sensor, PCB, lens assembly, lens retainer, support assembly and elastomeric gasket wherein the optical reading device is an optical indicia reading device for extracting data from information bearing indicia.

11. An optical reading device in accordance with claim 10, wherein the conductive elastomeric gasket comprises at least one contact to provide a contact point with a ground plane on the PCB.

12. An optical reading device in accordance with claim 10, wherein the conductive elastomeric gasket comprises at least one contact to contact a mounting surface of the image sensor.

13. An optical reading device in accordance with claim 10, wherein the conductive elastomeric gasket contacts the exposure surface of the image sensor.

14. An optical reading device in accordance with claim 10, wherein the conductive elastomeric gasket creates a sealed chamber.

15. An optical reading device in accordance with claim 10, wherein the conductive elastomeric gasket contacts a side of the image sensor.

16. An optical reading device in accordance with claim 10, wherein the conductive elastomeric gasket provides electromagnetic shielding for the image sensor.

17. An optical reading device in accordance with claim 10, wherein the conductive elastomeric gasket is die cut, injection molded or compression molded part separate from the support assembly.

18. An optical reading device in accordance with claim 10, wherein the conductive elastomeric gasket is overmolded into the support assembly.

19. An optical reading device in accordance with claim 10, wherein the conductive elastomeric gasket is thermally and/or electrically conductive.

20. An optical reading device in accordance with claim 1, wherein the thermally and electrically conductive elastomeric gasket contacts the PCB.

21. An optical reading device in accordance with claim 10, wherein the conductive elastomeric gasket contacts the PCB.

* * * * *